United States Patent [19]
Gosdowski et al.

[11] Patent Number: 5,305,683
[45] Date of Patent: Apr. 26, 1994

[54] PRESSURE-MEDIUM ACTUATED LINEAR UNIT

[75] Inventors: Gerhard Gosdowski, Bietigheim; Josef Neuwirth, Esslingen, both of Fed. Rep. of Germany

[73] Assignee: Robert Bosch GmbH, Stuttgart, Fed. Rep. of Germany

[21] Appl. No.: 986,568

[22] PCT Filed: Feb. 22, 1992

[86] PCT No.: PCT/DE92/00138
§ 371 Date: Dec. 7, 1992
§ 102(e) Date: Dec. 7, 1992

[87] PCT Pub. No.: WO92/17321
PCT Pub. Date: Oct. 15, 1992

[30] Foreign Application Priority Data
Apr. 6, 1991 [DE] Fed. Rep. of Germany ....... 4111202

[51] Int. Cl.⁵ .............................................. F01B 25/26
[52] U.S. Cl. .................................... 92/5 R; 92/13.5; 92/85 B; 92/128; 92/165 R; 92/165 PR
[58] Field of Search ............... 92/5 R, 13.5, 13.7, 92/13.8, 13.41, 85 B, 128, 165 R, 164, 166, 165 PR

[56] References Cited

U.S. PATENT DOCUMENTS

| | | | |
|---|---|---|---|
| 2,442,306 | 5/1948 | McCormic | 92/13.41 |
| 3,272,132 | 9/1966 | Stoelting et al. | 92/164 |
| 4,351,628 | 9/1982 | Drexel et al. | 414/749 |
| 4,555,979 | 12/1985 | Cetnarowski | 92/166 |
| 4,682,535 | 7/1987 | Stoll | 92/165 |
| 4,736,675 | 4/1988 | Stoll | 92/128 |
| 4,939,983 | 7/1990 | Lipinski | 92/166 |

FOREIGN PATENT DOCUMENTS

| | | | |
|---|---|---|---|
| 0017779 | 10/1980 | European Pat. Off. | |
| 0194234 | 9/1986 | European Pat. Off. | |
| 0299285 | 1/1989 | European Pat. Off. | |
| 0309613 | 4/1989 | European Pat. Off. | |
| 3014331 | 10/1981 | Fed. Rep. of Germany | 92/5 R |
| 3411823 | 10/1985 | Fed. Rep. of Germany | |
| 8319218 | 2/1986 | Fed. Rep. of Germany | |
| 2413184 | 12/1971 | France | |
| 2064671 | 6/1981 | United Kingdom | 92/166 |
| 2156434 | 10/1985 | United Kingdom | |

OTHER PUBLICATIONS

*Tol-O-Matic* Sales Brochure p. 10 Dec. 1985.
*Fluid*, 1988, No. 1-2, p. 56, Jan. 1988.

*Primary Examiner*—Thomas E. Denion
*Attorney, Agent, or Firm*—Spencer, Frank & Schneider

[57] ABSTRACT

A pressure medium linear unit for handling devices for industrial manufacture includes a housing block, at least one operating cylinder for at least one piston, at least one piston rod, at least one guide rod, and guide elements for at least one piston rod and at least one guide rod. The housing block accommodates the at least one operating cylinder for the at least one piston and the guide elements for the at least one piston rod and the at least one guide rod. The housing block is a modular unit and includes a guide unit and a drive unit releasably connected with the guide unit, one behind the other, to form a compact unit in the direction of linear movement. The guide rod and the piston rod are arranged in an axially parallel manner. The end of the guide rod at the end of the drive can be moved within the drive unit. If the guide rod is moved into the drive unit, the drive unit extends at least over the moved-in length of the guide rod. The guide unit includes the guide elements for the piston rod and the guide rod.

15 Claims, 2 Drawing Sheets

PRESSURE-MEDIUM ACTUATED LINEAR UNIT

BACKGROUND OF THE INVENTION

1. Field of the Invention

The invention is based on a pressure-medium actuated linear unit.

2. Background Information

In the case of a familiar linear unit (EP-B1 017 779), the drive unit is located in a housing block which is equipped with end flanges at both end faces, in which the guide elements for the piston rod and the guide rod are accommodated. This design necessitates that the guide rod and the piston rod must be guided out of the housing block on both sides. This arrangement makes it impossible for the linear unit to be designed as a compact unit.

In the case of another familiar linear unit (EP-A1 309 613), the guide elements for the piston rods and the guide rods, as well as the pressure medium drive, are integrated in a uniform housing block. For the various areas of application, linear units with differing stroke lengths are required. For the purpose of realising the various stroke lengths, apart from the guide rods and pistons rods, the length of the housing block must also be varied. Thus for the various stroke lengths, requiring high production depth, only small batch production is possible.

SUMMARY OF THE INVENTION

In contrast, the linear unit in accordance with this invention, with the characterising features of the main claim, has the advantage that a compact modular construction is possible. A further advantage is the fact that all significant function elements which require a high production depth are integrated into the guide unit, by which means the manufacturing batch size can be increased.

Through the measures listed in the dependent claims, further advantageous developments of the linear unit described in the main claim are possible. It is particularly advantageous to employ a constant length for all stroke lengths of the guide unit. A further advantage is in the manufacture of the guide unit and the drive unit from one extruded profile, with the extruded sections respectively containing the passages for the piston rod and the guide rod. It is furthermore expedient if the extruded part of the drive unit contains a further hole as a pressure medium path. A design which is advantageous for a compact construction consists of the fact that two guide rods are provided, which are connected with one another in the region of the drive unit by means of a connecting element. A further expedient design form consists in the drive unit being equipped with end position switches which are damped by a surface which is connected to the guide rod.

BRIEF DESCRIPTION OF THE DRAWINGS

A design example of the invention is represented in the drawings, and explained in further detail in the following description.

DETAILED DESCRIPTION OF THE PREFERRED EMBODIMENTS

Figure 1:
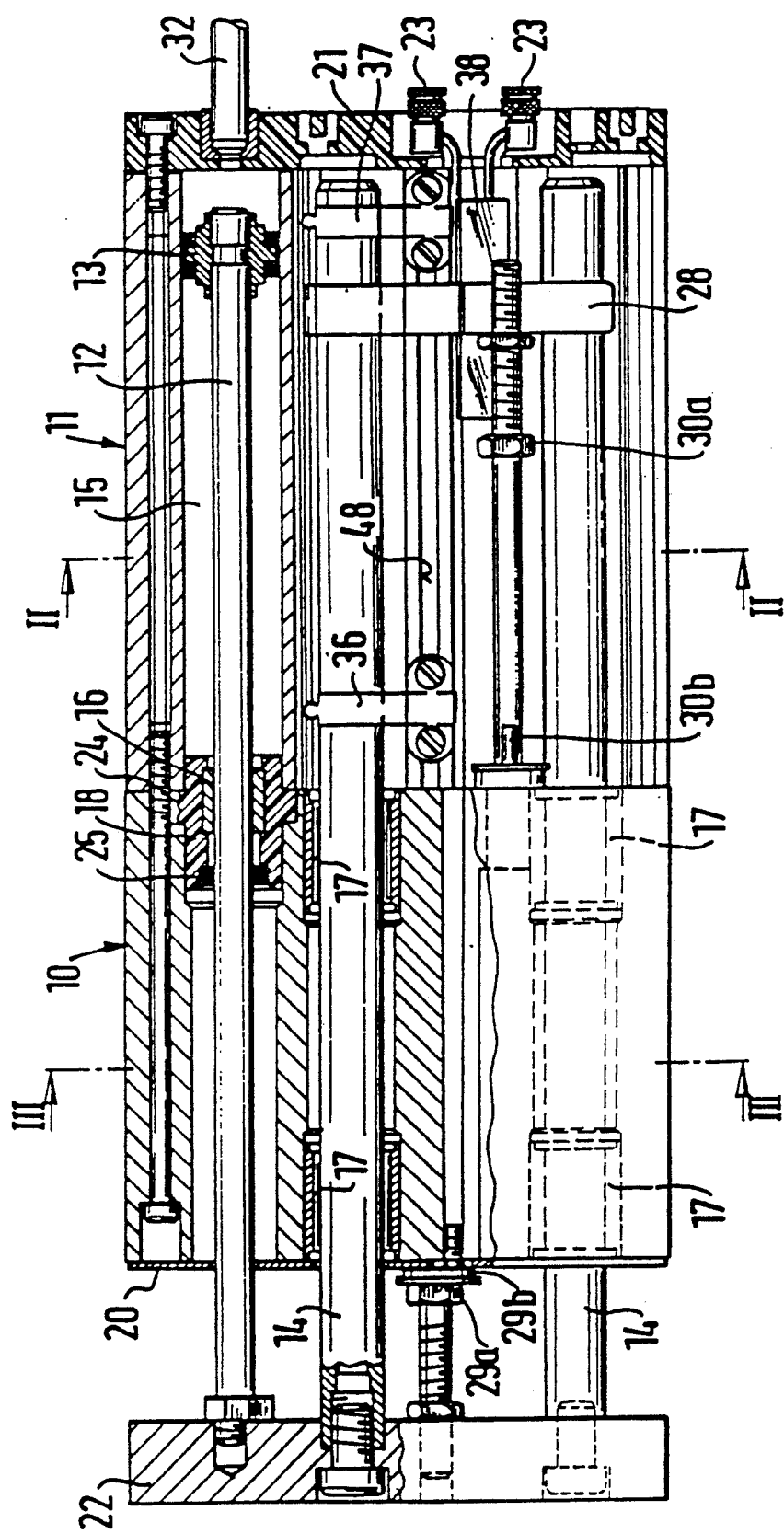
FIG. 1 shows a longitudinal section through a linear unit in accordance with the invention.

The linear unit represented in FIG. 1 consists of a guide unit 10, a drive unit 11, a piston rod 12, two guide rods 14, and an operating cylinder 15 in which a piston 13 is guided which is connected to the piston rod 12. The ends of the piston rod 12 and the ends of the two motion guide rods 14, which project from the guide unit 10, are fixed to a common operating yoke 22. The further structural elements of the linear unit, such as for example a gripper device, are fitted on the operating yoke 22.

Figure 2:
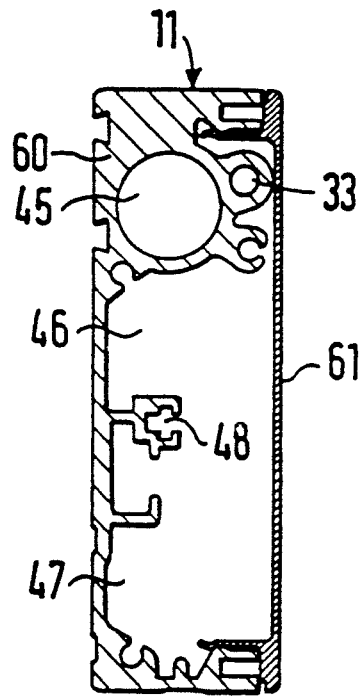
FIG. 2 shows a cross-section through II—II of the extruded profile of the drive unit, according to FIG. 1.
Figure 3:
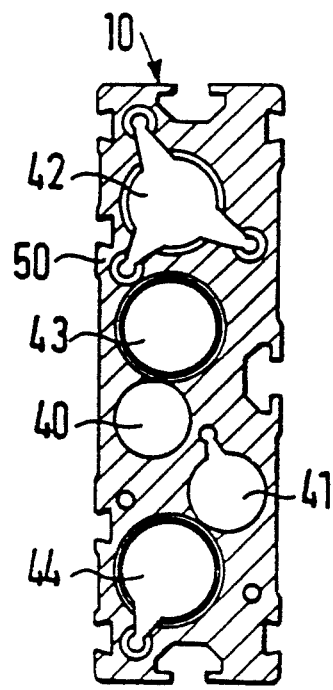
FIG. 3 shows a cross-section through III—III of the extruded profile of the guide unit, according to FIG. 1.

The housing block of the guide unit 10 and of the drive unit 11 are each manufactured from an extruded section 50 or 60 (FIG. 2 and FIG. 3). The extruded section 50 (FIG. 3) of the guide unit 10 has various cavities 40 to 44. Here, cavity 42 serves for the passage of the piston rods 12, and the cavities 43 and 44 respectively serve for the passage of the two guide rods 14. The drive unit housing 11 likewise has a cavity 45, which is arranged in alignment with cavity 42 of the guide unit 10. Profile 60 (FIG. 2) of the drive unit 11 has laterally open recesses 46, 47 for each of the two guide rods 14, whereby the profile 60 assumes an open form. For the purpose of achieving a closed housing, the profile 60 is laterally equipped with a protective cover plate 61, which is provided with snap-type connections which latch into the profile 60.

The guide unit 10 and the drive unit 11 are arranged end on to each other in the direction of the linear movement, and are coupled in a manner to allow for separation from each other. For this purpose, further holes are provided in the profiles 50 and 60, which serve as clearance and tapped holes for the connecting screws. In the current design example, both profiles 50 and 60 are connected, for example, by four Allen screws which are inserted through the profile 50 of the base body 10 and are screwed into the threaded holes of the drive unit 11.

On the end face of the profile 50, the guide unit 10 is equipped with an end plate 20, which contains the corresponding passages for the piston rod 12 and the two guide rods 14. The end face of the profile 60 of the drive unit 11 is closed by an end plate 21.

In the guide unit 10, a guide bush 16 for the piston rod 12, and two guide bushes 17 for each guide rod 14 are fitted. The guide bushes 17 are, for example, linear ball races which are inserted at the two end faces of the profile 50, into the cavities 43 and 44. The cavity 45 of the drive unit 11 forms the operating cylinder 15 for the pneumatic drive. The guide bush 16 is inserted into a further bush 18, which has a collar 24. The bush 18 is inserted into the end face of the guide unit 10, which is connected to the end face of the drive unit 11, in such a way that the collar 24 closes off the operating cylinder 15 from the guide unit 10 with an air-tight seal. The translationally moved piston rod 12 is additionally equipped, in the bush 18, with a seal 25 which encloses the piston rod 12. To form the operating cylinder 15, the end plate 21 is mounted on the profile 60 in such a way that it seals off the cavity 45 in an air-tight manner.

In order to drive the piston 13, the operating cylinder 15 is equipped with a compressed air connection in the region of each of the two end faces. In the current drawing, only the compressed air connection 32 is shown, which is set into the end plate 21 and which supplies compressed air to the operating cylinder 15 at the right-hand end face. At the side of the operating cylinder 15, opposite this compressed air connection 32, a further compressed air supply, not shown, is fed into the operating cylinder 15. This compressed air connection is led into the operating cylinder 15 by means of a hole 33 drilled into the profile 60. The pressure medium line 33 is equipped with a transverse hole which extends into the operating cylinder 15. The compressed air connection for the pressure medium line 33 is made through the end plate 21, in a manner similar to the pressure medium connection 32.

The movement direction of the piston 13 is controlled by a pneumatic valve, which is located outside the drive unit 11 and which is not shown in the drawing.

The two guide rods 14 which project into the drive unit 11 are rigidly connected to each other within the drive unit 11 by means of a connecting element 28. This ensures that the guide rods 14 do not cant in their guides. The design of the laterally open profile 60 makes it possible to accommodate the connecting element 28 within the drive unit.

In order to set the stroke of the linear unit, two inductive end position switches 36, 37 are provided, which are damped by a surface 38, for example a sheet metal strip, which is firmly connected with the guide rods 14.

For setting the stroke length, the end position switches 36, 37 are located, axially movable, in a groove 48 of the profile 60. The electrical connection of the two inductive end position switches 36, 37 is made via two connections 23 provided at the end plate 21.

To limit the stroke length, two adjustable limit stops 29a, b and 30a, b are additionally provided. with each limit stop part 29a or 30a being allocated a damping medium 29b or 30b respectively. The damping media 29b and 30b are inserted in the passages 40 or 41 of the profile 50.

Due to the guide unit 10 being equipped with all guide elements for the piston rod 12 and the two guide rods 14, all the functions which require a precise manufactured length are integrated in the guide unit 10. Thus it is possible to use, for the various stroke lengths, a guide unit 10 of uniform length, requiring length variation only in the case of the drive unit 11, the piston rod 12, the two guide rods 14 and the protective cover 61. Apart from the pneumatic drive described, equipping the linear unit with a hydraulic drive is equally conceivable.

We claim:

1. A pressure medium actuated linear unit for handling apparatus for industrial manufacture, the unit including:
   a housing block;
   at least one operating cylinder for at least one piston;
   at least one piston rod;
   at least one guide rod; and
   guide elements for the at least one piston rod and the at least one guide rod;
   wherein the housing block accommodates the at least one operating cylinder for the at least one piston and the guide elements for the at least one piston rod and the at least one guide rod;
   wherein the housing block is a modular unit and comprises:
   a guide unit; and
   a drive unit releasably connected with the guide unit, one behind the other, to form a compact unit in the direction of linear movement;
   wherein the guide rod and the piston rod are arranged in an axially parallel manner;
   wherein the end of the guide rod at the end of the drive can be moved within the drive unit;
   wherein if the guide rod is moved into the drive unit, the drive unit extends at least over the moved-in length of the guide rod; and
   wherein the guide unit includes the guide elements for the piston rod and the guide rod.

2. Linear unit in accordance with claim 1, wherein the guide unit has a constant length for all required stroke lengths of the linear unit.

3. Linear unit in accordance with claim 1, wherein the guide unit and the drive unit are each produced from an extruded profile,
   wherein contained in the extruded profile of the guide unit are first passages for the piston rod and the guide rod, and
   wherein in the extruded profile of the drive unit, a second passage is provided for forming the operating cylinder.

4. Linear unit in accordance with claim 3, wherein the guide elements are bushes which are enclosed in the first passages of the guide unit.

5. Linear unit in accordance with claim 3, wherein the extruded profile of the drive unit contains a further passage as a pressure medium path.

6. Linear unit in accordance with claim 5, wherein the drive unit is equipped with an end plate which closes off the second passage, as well as the further pressure medium path, in an air-tight manner.

7. Linear unit in accordance with claim 6, wherein the end plate is a plastic injection-moulded part, in which pressure medium connections for the operating cylinder are provided.

8. Linear unit in accordance with claim 5, wherein the piston which is movable within the operating cylinder is pressurizable from two sides by a first pressure medium supply line connecting to an end face of the operating cylinder, and by a second compressed air supply line routed via the pressure medium path to an opposite end of the operating cylinder.

9. Linear unit in accordance with claim 1, wherein two guide rods are provided which are connected to each other in the region of the drive unit by means of a connecting element, and
   wherein an extruded profile of the drive unit has laterally open recesses for each of the two guide rods, in the region of which the connecting element is arranged.

10. Linear unit in accordance with claim 1, wherein the drive unit is equipped with two end position switches, and the guide rod is equipped with means for damping the end switches.

11. Linear unit in accordance with claim 10, wherein the end position switches are located, longitudinally movable, in an axial groove of the extruded part of the drive unit.

12. Linear unit in accordance with claim 1, wherein longitudinally moved elements of the linear unit are equipped with a limit stop in each direction of movement.

13. Linear unit in accordance with claim 10, wherein electrical connections for the end position switches are arranged on an end plate of the drive unit.

14. Linear unit in accordance with claim 12, wherein the limit stops are equipped with dampers.

15. A pressure-medium actuated linear unit for handling devices in industrial manufacturing, having a housing block which accommodates at least one operating cylinder for at least one piston, and guide elements for at least one piston rod and at least one guide rod;

wherein the housing block comprises a guide unit and a drive unit, which, in the direction of linear movement are detachably connected to one another in series to form a compact unit so that, if the guide rod is inserted into the drive unit, the drive unit extends at least over the inserted length of the guide rod;

wherein the guide unit contains guide elements for the at least one piston rod and the at least one guide rod;

wherein the at least one guide rod comprises two guide rods which are connected to each other in the region of the drive unit by means of a connecting element; and wherein an extruded profile of the drive unit has laterally open recesses for each of the two guide rods, the connecting element being arranged in the region of the recesses.

* * * * *